United States Patent Office 3,270,084
Patented August 30, 1966

3,270,084
METHOD OF ISOMERIZING OLEFINS
Alan Schriesheim, Berkeley Heights, N.J., Charles A. Rowe, Jr., Brooklyn, N.Y., and William Bartok, Cranford, N.J., assignors to Esso Research and Engineering Company, a corporation of Delaware
No Drawing. Filed May 19, 1961, Ser. No. 111,173
5 Claims. (Cl. 260—683.2)

The instant invention relates to organic conversion reactions and solvent systems for facilitating such reactions. More specifically, the instant invention teaches the utilization of a unique base-solvent system for carrying out a variety of chemical conversion reactions which proceed by the carbanion mechanism.

Carbanion reactions are well known in the art and have been employed in a variety of chemical conversions. These reactions proceed via the formation of a carbanion intermediate, i.e. a negatively charged carbon ion. Conventionally, strong basic catalysts are employed, such as the Group I metals, especially the alkali metals, such as sodium and potassium. (see U.S. Patent 2,952,719.) In order to facilitate these reactions, either-type solvents, such as tetrahydrofuran, have been used. The use of solvents to enhance the reactivity of reactions is well known. See, for example, Lohse, Catalytic Chemistry, Chemical Publishing Company, Inc., New York, 1945, pages 75–76.

Despite the advances made in solvent and catalytic technology, many reactions have not achieved commercial acceptance because of the rigorous conditions necessary to stabilize the carbanion. With some reactants, i.e. those having weakly ionizable C–H bonds, the stabilization of carbanions has been, for all practical purposes, impossible.

In copending application, Serial No. 111,172, filed May 19, 1961, and now Patent No. 3,213,155, it had been found that particular solvent-base systems were effective for a variety of chemical reactions which proceed by the carbanion mechanism. Therein it was disclosed that the solvent employed should be characterized by the following properties: (1) aprotic, (2) a high dielectric constant ($e$) in excess of 15 at 25° C., (3) dipolar, and (4) nonhydroxylic. However, it has been found that the solvents disclosed therein, such as N,N-dimethyl formamide and dimethyl sulfoxide suffer from certain serious disadvantages which are overcome by the solvents taught by this invention.

More specifically, these solvents of the instant invention are advantageous for the following reasons:

(1) They are inert to basic hydrolysis. Hence, the improved solvents will not react with the base. Such reaction consumes both the solvent and the base and decreases the reactivity of the system.

(2) They are not reactive towards oxidizing and reducing gases such as oxygen, hydrogen, nitrous oxide, and sulfur dioxide. Reactions with these gases result in the destruction of both the reagent and the solvent.

(3) These solvents do not degrade when subject to high temperatures. This facilitates the separation of the solvent by distillation and its subsequent recovery.

In accordance with this invention, it has been found that certain solvents can be advantageously employed for oxidation and overcome the disadvantages of the solvents previously disclosed. Of course, the solvents employed must be base stable, i.e. resistant to decomposition in the presence of the base and reactants. More specifically, the solvents of the instant invention, in addition to being defined by the above-named properties, must also possess the following characteristics: (1) the dipolar group must be hydrogen-free and (2) the atoms adjacent to the dipolar group must be hydrogen free.

These solvents include organic compounds having the following dipolar groups: (1) a carbonyl, a divalent CO radical; (2) phosphoryl, a trivalent PO radical; (3) sulfinyl or sulfoxide, the divalent SO radical; (4) the sulfonyl or sulfonate, the bivalent $SO_2$ radical; and (5) thiocarbonyl, the divalent CS radical.

Examples of the carbonyl type compounds include tetraalkyl substituted ureas, such as tetramethyl urea, and substituted acetamides, such as t-butyl dimethyl formamide. Compounds having the phosphoryl radical include hexa-substituted phosphoramides, such as hexamethyl phosphoramide, tri(ethylene amide) phosphoramide, and hypophosphite esters. The sulfinyl radical compounds include tetraalkyl substituted sulfonamides, such as tetramethyl sulfonamide and bis-dialkyl amino sulfoxide. An example of the sulfones is tetramethyl sulfone, and an example of compounds having a thiocarbonyl group is alkyl substituted thioureas, such as tetramethyl thiourea. The above list of compounds is given by way of example only and is not to be considered exhaustive.

The base employed may be any of a wide variety of materials. The only limitation on this material is that it must have sufficient basicity to permit the reactions to proceed. Examples of suitable bases include metal hydrides, such as sodium hydrides; metal inorganic amides, such as sodium amide; alkali metal and alkaline earth metal organic amides, such as sodium methyl amide; metal alkoxides, such as sodium methoxide and potassium t-butoxide; and alkali and alkaline earth metal hydroxides, such as sodium hydroxide and cesium hydroxide; and metal alkyls, such as sodium ethyl and butyl lithium. Particularly preferred are bases composed of the heavy alkali metals, e.g. potassium, cesium and rubidium. Furthermore, where the base has an alkyl group effectiveness is increased by increasing the number of carbon atoms. E.g. $KOC_2H_5$ is more effective than $KOCH_3$ and KO-t-butylate is more effective than both. The listing is by way of illustration only. Clearly, other suitable bases are known to those skilled in the art.

The particular conversion reactions contemplated include a wide variety of known reactions. Broadly, almost any organic compound can be reacted which has an acidic hydrogen attached to a carbon atom which may be removed to form the carbanion intermediate. In addition, since these solvents facilitate ionic reactions any reaction involving an organo-metallic compound will be enhanced. The following list will include the major reactions:

(1) The polymerization of olefins, diolefins, and vinyl-type compounds,
(2) Aldol and Cannizzaro condensations and the condensation of malonic esters including Michael-type additions,
(3) Side-chain alkylations of aromatics with olefins, ketones with organic halides, and metal alkyls with olefins,
(4) Olefin double-bond and skeletal isomerization,
(5) a. Oxidation of alkyl aromatics, such as toluene, xylene, and mesitylene, etc., to repective mono and dicarboxylic acids,
    b. Oxidation of various alkyl, nitrogen, and sulfur aromatic ring compounds including alpha, beta, and gamma picolines, and various alkyl thiophenes to the respective mono or diacids,
    c. Oxidation of olefins to acids,
    d. Oxidation of all the materials included in a, b and c, including ammonia as a base so that the ammonia salt is produced directly,
    e. Direct oxidation of benzene to phenol,
    f. Oxidation of the compounds mentioned in a, b, and c to alcohols, g. Oxidation of alkyl aromatics to ketones, for example, ethyl benzene to acetophenone, h. Oxidation of mercaptans to either disulfides or sulfonic acids, (6) a. Carboxylation of alkyl aromatics, such as toluene, to produce phenylacetic acid, b. Carboxylation of olefins, such as propylene, to yield acrylic acid, (7) Carbonylation of alkyl aromatics, olefins, etc. with carbon monoxide to yield aldehydes, (8) Carbene generation from halogen substituted compounds, ethers, sulfides, ammonia salts, etc. and the addition of the generated carbenes to olefins, diolefins and aromatics, (9) Homogeneous hydrogenation of olefins, diolefins, and aromatics,

(10) Formation of vinyl ethers by reaction of alkynes and alcohols,

(11) Benzyne formation from any known benzyne precursors,

(12) Production and reaction of organo-metallics, such as:
  (a) Grignard reagents from organic halides and magnesium,
  (b) metal alkyls from metal and organic halides,
  (c) hydroboration of olefins and diolefins,

(13) Silene generation and reactions thereof.

The reaction phase may be either homogeneous or heterogeneous again depending upon the particular system and reaction. Where the base is soluble in the solvent, such as various alkoxides (potassium t-butoxide), then the reaction is homogeneous in base and, if desired, may be homogeneous in hydrocarbon; as, for an example, the olefins are soluble to the extent of about 10 volumes to 1 at 25° C. in hexamethylphosphoramide. Practically, the isomerization reaction could be operated heterogeneously where the olefins are separated by a simple mixer-settler operation. Certain bases, such as potassium hydroxide and sodium hydroxide, are insoluble in hexamethylphosphoramide; and here a fixed bed might be used with the hydrocarbon and solvent contacting the solid base. These considerations would hold true for reactions involving only hydrocarbons, such as isomerization, polymerization, and aldolization.

Obviously, when a gas is present, such as oxygen, carbon monoxide, or carbon dioxide, the above considerations will hold; but the reaction zone will also contain another gaseous phase.

The particular ratios of solvent to base and base to reactant are dependent on a variety of factors. For example, in homogeneous systems, it is desirable to have at least 10 weight percent of base dissolved in the solvent up to saturation. It is preferable that from 20 to 40 weight percent of the solvent-base system be composed of base. In heterogeneous base-solvent systems, the base is practically insoluble. However, the amount of solvent present must be sufficient to ensure wetting the surface of the base. More solvent may be used if it is desirable to dissolve the feed. In the case of olefin polymerization, small amounts of base may be employed, the amount of base being determined by the particular molecular weight desired for the product polymer. That lower base concentrations result in higher molecular weight polymers is well known in the art, as is the amount of base that should be employed for a particular molecular weight range.

The ratio of the amount of base to the reactants is also dependent on a variety of factors, such the the particular base, solvent and reaction contemplated. However, this ratio should be adjusted so as to permit the reaction to run at a rate of at least .1 w./hr./w. This selection of variables can be readily determined by one skilled in the art.

In carrying out the reactions disclosed herein temperatures from 15 to 400° C. can be used. Most preferably from 20–150° C. As would be expected the higher temperatures accelerate the reaction; however, excessively high temperatures may be detrimental to the solvent-base system and the selectivity of the reaction.

In oxidation reactions it is desirable to more closely regulate the temperature. Preferably temperatures higher than 200° C. should be avoided. Most preferably oxidation temperatures should be maintained between 20 and 80° C.

Another advantage of the instant base-solvent systems is that in isomerization high stereo-selectivity to the cisisomer is obtained. This is particularly true where a small alkyl group is attached to the carbon atom adjacent to the double bond. As the length of the alkyl group increases selectivity decreases. For example, a t-butyl group reduces the stereo-selectivity of the isomerization reaction 20 times as compared to a methyl group.

EXAMPLE 1

To show the effectiveness of the various base-solvent systems for isomerization, 20 cc. samples of 2-methyl-pentene-1 were subject to isomerization at 55° C. and atmospheric pressure. The following data show the conversion of olefins with 200 cc. of various solvents.

Table I

| Solvent | Dielectric Constant at 25° C. | Molarity of Base in Solvent (K-t-butoxide) | Conversion of Olefins K isom., min.$^{-1}$ |
|---|---|---|---|
| Hexamethylphosphoramide | 36 | 0.91 | $5 \times 10^{-2}$ |
| Do | 36 | 0.481 | $1.7 \times 10^{-3}$ |
| Tetramethyl urea | 24 | 1.0 | $4 \times 10^{-4}$ |
| Tetrahydrofuran | 3 | 1.0 | ~0 |
| t-Butyl alcohol | 8 | 1.0 | ~0 |

The above data clearly show the increased rate of isomerization with the improved solvent-base system of this invention. Tetrahydrofuran and t-butyl alcohol, the hitherto solvents employed, resulted in no conversion, while high conversions were achieved with the solvents defined by the invention.

EXAMPLE 2

To show that other olefins may be readily isomerized, 20 cc. of pentene-1 were contacted with a hexamethylphosphoramide-K-t-butoxide system. 200 cc. of the solvent were used and the molarity of the base was 0.910. The rate conversion of olefins (K isom., min.$^{-1}$) was $6.3 \times 10^{-3}$.

EXAMPLE 3

That improved rate of isomerization may be obtained by using a heavy alkali metal base is illustrated by the data in the following table. The olefin used was 10% 2-methyl-pentene-1. 100 ml. of solvent were employed and 0.4 mole base.

Table II

| Solvent | Na-t-butoxide | Rb-butoxide | K-t-butoxide | Cs-t-butoxide |
|---|---|---|---|---|
| Hexamethylphosphoramide | $6 \times 10^{-5}$ | $5.6 \times 10^{-3}$ | $1.7 \times 10^{-3}$ | $10.4 \times 10^{-3}$ |
| Tetramethylurea | | $2.1 \times 10^{-4}$ | $.286 \times 10^{-4}$ | $9.2 \times 10^{-4}$ |
| Diethyl dimethyl urea | | $3 \times 10^{-3}$ | | $8.6 \times 10^{-5}$ |

The above data show that over an increase in rate olefin isomerization (K min.$^{-1}$) is obtained by using a base having an alkali metal of a high molecular weight.

EXAMPLE 4

The following experiments were performed to show the oxidation of alkyl aromatics with the base-solvent system of the invention. All preparations were made in a nitrogen-dry boxing using 100 milliliters of hexamethylphosphoramide and essentially alcohol-free potassium t-butoxide as the base. Half the required volume of the base was poured into a glass-stoppered graduated cylinder and the base slowly added with continuous shaking to increase solubility. As the limit of the base solubility was approached, the remaining solvent was added and the procedure repeated until the specific amount of base was dissolved in the solvent. The required amount of the reaction mixture, i.e. an alkyl aromatic, was introduced into a specially adapted heavy-walled flask. The flask was first flushed with nitrogen. The homogeneous solvent-base solution previously prepared was then poured into the reaction flask and an atmosphere of oxygen then displaced the nitrogen. The entire reaction mixture was allowed to stand (without stirring) until equilibrium was reached. At this time, a magnetic stirrer was turned on to begin the experiment. At the completion of the reaction, the mixture was poured onto 100 g. of ice which hydrolyzed the remaining potassium t-butoxide. The diluted mixture was submitted to analysis as follows. The reaction mixture plus water was first extracted with 25 ml. of normal heptane to extract the unreacted aromatics. The raffinate portion was then extracted ten times with 20 ml. of cyclohexane and an aqueous and hydrocarbon phase recovered, the latter phase containing additional unreacted aromatics. The aqueous phase containing the solvent (hexamethyl phosphoramide) and salts was then extracted with sodium hydroxide and ether. The ether phase contained the solvent, while the aqueous phase contained the salts. The salts were then treated with HCl and extracted with ether. The aqueous phase from the ether extract contained free carboxylic acid. By steaming, the ether was removed and the solid carboxylic acid obtained. The following table summarizes the data from five different runs.

*Table III*

SUMMARY OF ALKYLBENZENE OXIDATION RUNS

| Feed: | | | | | |
|---|---|---|---|---|---|
| Toluene, gms. | | | 2.20 | 2.23 | 2.22 |
| Xylene, gms. | 1.46 | 1.48 | | | |
| K-t-Butoxide, gms. | 7.5 | 7.5 | 5.0 | 7.5 | 15.0 |
| Solvent | (¹) | (¹) | (¹) | (¹) | (¹) |
| O₂ Pressure, Atm. | 1 | 1 | 1 | 1 | 1 |
| Temperature, ° C. | 25 | 80 | 25 | 25 | 25 |
| Time, Hrs. | 20 | 20 | 20 | 20 | 20 |
| Products Analysis: | | | | | |
| Unoxid. Starting Material, gms. | 0.93 | | 1.38 | | |
| Carboxylic Acid, gms. | ² 0.60 | ² 0.77 | 0.70 | 0.84 | 1.0 |
| Conversion, Mol. percent | 27 | 35 | 24 | 29 | 34 |
| Selectivity, percent | 100 | 100 | 100 | 100 | 100 |

¹ 100 ml. HMPA.

² Recent work has shown that these yields are low by about 33%.

Where toluene was reacted, the product was benzoic acid. When xylene was reacted, the product was phthalic acid. It will be noted that the reaction is outstandingly selective for the particular carboxylic acid and yields of up to 35 mole percent are obtained. It should further be noted that by raising the temperature from 25 to 80° C. considerably improved yields of the phthalic acid were obtained. A run essentially similar to the first toluene run (center column, Table III) was also made. However, the product was analyzed at the end of 6½ hours. It was found that the yield of benzoic acid was 17.07%.

EXAMPLE 5

To show the advantages of the instant invention over the conventional hydroxy solvents, the following experiment was performed. 0.024 mole of toluene was reacted with a base-solvent system consisting of 0.09 mole of potassium t-butoxide and 100 milliliters of t-butyl alcohol. The temperature was maintained at 25° C. and 1 atmosphere pressure of oxygen introduced into the reaction flask in a manner similar to that described in Example 3. After 20 hours, the contents of the flask were analyzed, and it was found that none of the toluene was converted to benzoic acid.

EXAMPLE 6

To demonstrate the use of the instant invention in carbene formation, the following experiment was performed. Methyl chloride was added to a flask containing potassium t-butoxide in hexamethylphosphoramide at room temperature. Cyclohexane was added to trap any carbene formed. The following table shows the reagents used and the products formed.

*Table IV*

Solvent, 300 cc. hexamethylphosphoramide.

| | | |
|---|---|---|
| Base KOtBu | g | 18.5 |
| Temp., ° C. | | 25 |
| CH₃Cl | g | 7.58 |
| Cyclohexene | g | 114.5 |

Products:

| | | |
|---|---|---|
| t-Butyl methylether | percent | 59.36 |
| t-Butyl alcohol | do | 21.47 |
| Norcarane ¹ | do | 4.40 |
| C₉+ | do | 14.77 |

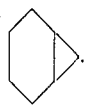

As will be noted, 4.4% of norcarane was formed. The products were analyzed by gas-liquid partition chromatography. This experiment represents the first time that methyl chloride has produced norcarane in relatively high yields. Previously, norcarane was produced by diazomethane decomposition, an expensive technique.

EXAMPLE 7

In a manner similar to that described in Example 6, a carbene was produced from chloroform according to the following reaction:

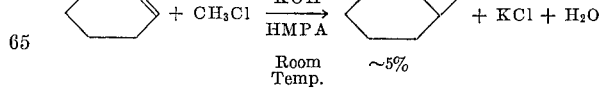

The reaction was carried out at room temperature using the weak base, potassium hydroxide, dissolved in hexamethyl phosphoramide. A 25% yield was obtained.

EXAMPLE 8

The oxidation of sulfur compounds is of particular importance in sweetening petroleum stocks. To show the oxidation of mercaptans to their corresponding sulfonic acids, the following experiment was performed. The reaction was carried out in a stirred glass flask containing the solvent-base and mercaptan. A constant pressure (atmospheric pressure) of oxygen was applied to the flask. At the end of the run, the entire product was neutralized with HCl and analyzed. The following table shows the quantities of materials used and the product obtained in two runs.

Table V
SULFONIC ACIDS
[25° C., atm. p.]

|  | Solvent | Cc. | Base | Gms. | Time, min. | $O_2$ Absorbed, 1 |
|---|---|---|---|---|---|---|
| Run #1 | N-N,Dimethyl formamide | 100 | K-t-butoxide | 10.3 | 45 | 0.628 |
| Run #2 | Hexamethylphosphoramide | 100 | ----do---- | 7.5 | 60 | 0.027 |

| Reactants: |  |  |
|---|---|---|
| n-Butyl mercaptan, moles | 0.1 | 0.1 |
| $O_2$ | (¹) | (¹) |
| Solvent, cc.: |  |  |
| Hexamethylphosphoramide | 83 | 83 |
| Methanol | 10 | 10 |
| Base, moles: |  |  |
| Sodium methoxide | 0.2 |  |
| Sodium hydroxide |  | 0.2 |
| Time, min | 418 | 418 |
| Conversion of RSH, percent | ~100 | ~100 |
| Products: |  |  |
| n-Butyl sulfonic acid, percent | ~90 | ~90 |

¹ 1 atm. pressure of $O_2$ maintained.

It should be noted that essentially complete conversion of mercaptans was obtained and approximately 90% of the corresponding sulfonic acid formed.

EXAMPLE 9

The polymerization of olefins may be readily effected by use of butyl lithium dissolved in hexamethylphosphoramide. 150 cc. of butadiene were dissolved with 400 cc. of hexamethyl phosphoramide containing 20 g. of butyl lithium at room temperature. Total conversion of the polymer was obtained in a matter of a few seconds.

EXAMPLE 10

Twenty-five grams of benzyl potassium were dissolved in 200 cc. of hexamethylphosphoramide. The solution was placed under 700 pounds pressure of ethylene. It was found that 10 moles of ethylene were absorbed for each mole of benzyl potassium. The product, as yet not conclusively analyzed, obtained after hydrolysis consisted of 52 grams of a viscous liquid.

EXAMPLE 11

To show the improved oxidation stability of the solvents of the invention over solvent having hydrogen atoms on the dipolar atom or atom adjacent to the dipolar atom, the following solvent-base systems were subjected to a one atmosphere pressure of oxygen.

The amount of $O_2$ absorbed is a measure of the oxygen stability of the solvent in the presence of base. It was noted that in Run #1 the dimethylformamide, $$HCON(CH_3)_2$$

which has a hydrogen atom attached to the dipolar carbonyl radical absorbed a greater amount of oxygen than the hexamethylphosphoramide, which has no hydrogen atoms on the phosphoryl radical or on the adjacent atoms.

EXAMPLE 12

To show the stereo-selectivity of the solvent-base systems of the instant invention, 20 cc. of butene-1 were isomerized in 200 cc. of hexamethylphosphoramide containing 1 mole of K-t-butoxide. 80% conversion to butene-2 was obtained, 76% was cis-butene-2 and 4% trans-butene-2.

The above examples serve only to illustrate the instant invention.

What is claimed is:
1. An improved method for effecting the isomerization of monoolefin hydrocarbons in a carbanion reaction which comprises contacting said monoolefinic hydrocarbons with a solvent-base system, which consists essentially of hexamethyl phosphoramide and a base selected from the group consisting of alkali metal hydrides, alkali metal inorganic amides, alkali metal and alkaline earth metal organic amides, alkali metal alkoxides, alkali metal and alkaline earth metal hydroxides and alkali metal alkyls in an amount and for a period sufficient to form a carbanion intermediate which rapidly leads to the shift in the position of the double bond in said monoolefinic hydrocarbon.
2. The method as defined in claim 1 wherein said base is an alkali metal alkoxide.
3. The method as defined in claim 1 wherein said base is rubidium tertiary butoxide.
4. The method as defined in claim 1 wherein said base is potassium tertiary butoxide.
5. The method as defined in claim 1 wherein said base is cesium tertiary butoxide.

References Cited by the Examiner
UNITED STATES PATENTS
2,487,859  11/1949  Dickey et al. _____ 260—551

FOREIGN PATENTS
839,420  6/1960  Great Britain.

JOSEPH L. SCHOFER, *Primary Examiner.*

MORRIS LIEBMAN, *Examiner.*

L. WOLF, *Assistant Examiner.*